United States Patent
Kim et al.

(10) Patent No.: US 11,401,970 B2
(45) Date of Patent: Aug. 2, 2022

(54) MAGNETIC BEARING CONTROL DEVICE AND CONTROL METHOD

(71) Applicant: LG ELECTRONICS INC., Seoul (KR)

(72) Inventors: Kyung Min Kim, Seoul (KR); Joonsik An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 16/959,753

(22) PCT Filed: Jan. 4, 2019

(86) PCT No.: PCT/KR2019/000151
§ 371 (c)(1),
(2) Date: Jul. 2, 2020

(87) PCT Pub. No.: WO2019/135635
PCT Pub. Date: Jul. 11, 2019

(65) Prior Publication Data
US 2021/0372472 A1 Dec. 2, 2021

(30) Foreign Application Priority Data
Jan. 5, 2018 (KR) .................. 10-2018-0001656

(51) Int. Cl.
*F16C 32/04* (2006.01)

(52) U.S. Cl.
CPC ...... *F16C 32/0451* (2013.01); *F16C 32/0457* (2013.01)

(58) Field of Classification Search
CPC .............. F16C 32/0451; F16C 32/0457; F16C 2362/52; A47G 9/1045; A47G 9/1081;
(Continued)

(56) References Cited

U.S. PATENT DOCUMENTS

| | | | |
|---|---|---|---|
| 6,326,712 B1 | 12/2001 | Nakazawa et al. | |
| 2002/0011754 A1* | 1/2002 | Shinozaki | F16C 32/0457 310/90.5 |
| 2002/0096954 A1* | 7/2002 | Shinozaki | F16C 32/0457 310/90.5 |

FOREIGN PATENT DOCUMENTS

| | | |
|---|---|---|
| CN | 107044483 | 8/2017 |
| JP | H11-206179 | 7/1999 |

(Continued)

OTHER PUBLICATIONS

European Search Report dated Sep. 1, 2021 issued in Application No. 19736167.8.

*Primary Examiner* — Ahmed Elnakib
(74) *Attorney, Agent, or Firm* — Ked & Associates, LLP

(57) ABSTRACT

Magnetic bearing control device and control method are disclosed. A magnetic bearing control device according to an embodiment of the present invention comprises: a bearing control unit for outputting a plurality of switch control signals on the basis of gap information of a bearing coil and a rotor and current information applied to the bearing coil; and a coil driving unit for turning a plurality of self-formed switching elements on/off in accordance with the plurality of switch control signals and controlling the amount of current applied to the bearing coil and thus adjusting the magnetic field strength between the bearing coil and the rotor. The bearing control unit generates and outputs the plurality of switch control signals such that bootstrap capacitor charging time of the coil driving unit may be secured. Therefore, a magnetic bearing control circuit structure may be simplified by means of an additional bootstrap capacitor structure.

13 Claims, 13 Drawing Sheets

(58) Field of Classification Search
CPC ...... A61H 1/008; A61H 1/0292; A61H 39/04;
A61H 2201/1609; A61H 2201/1614;
A61H 2201/1623
USPC ........................................................ 310/90.5
See application file for complete search history.

(56) References Cited

FOREIGN PATENT DOCUMENTS

| JP | H11206179 | * | 7/1999 |
| KR | 10-2001-0086234 | | 9/2001 |
| KR | 10-2002-0010100 | | 2/2002 |
| KR | 10-0757529 | | 9/2007 |
| KR | 10-1385977 | | 4/2014 |
| KR | 20180081369 | * | 7/2018 |

* cited by examiner

[FIG. 1]
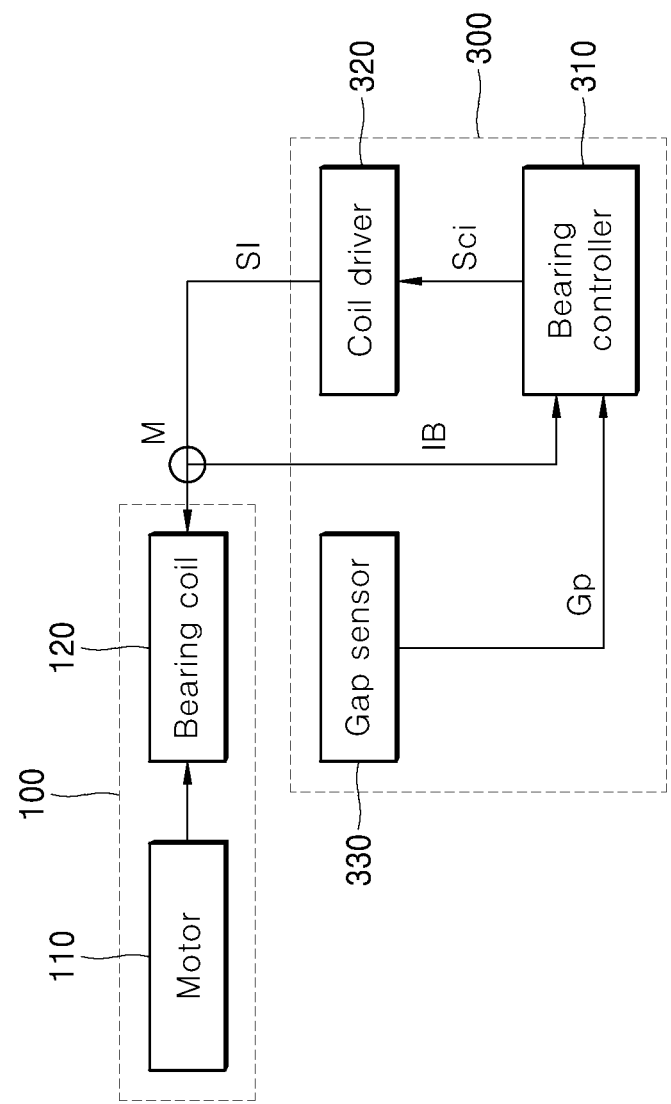

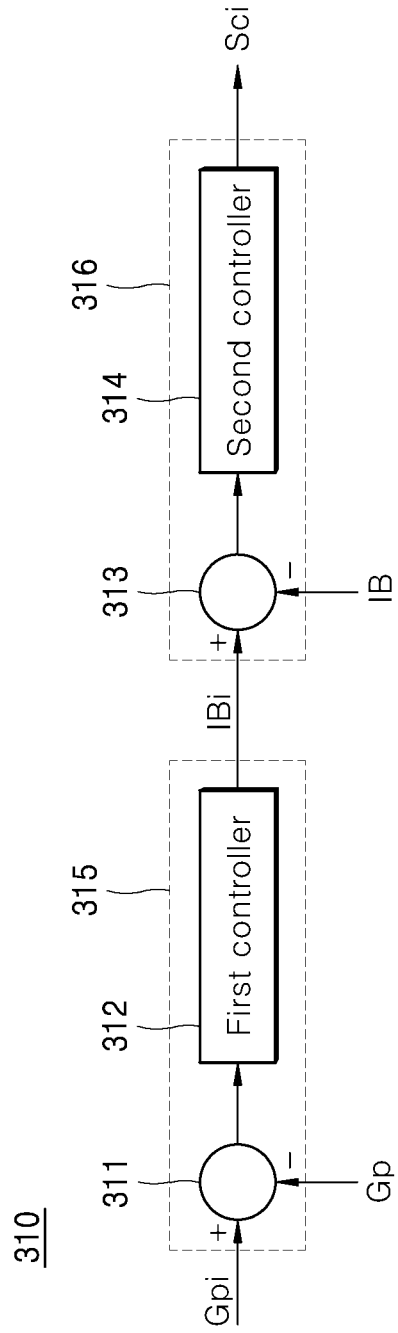

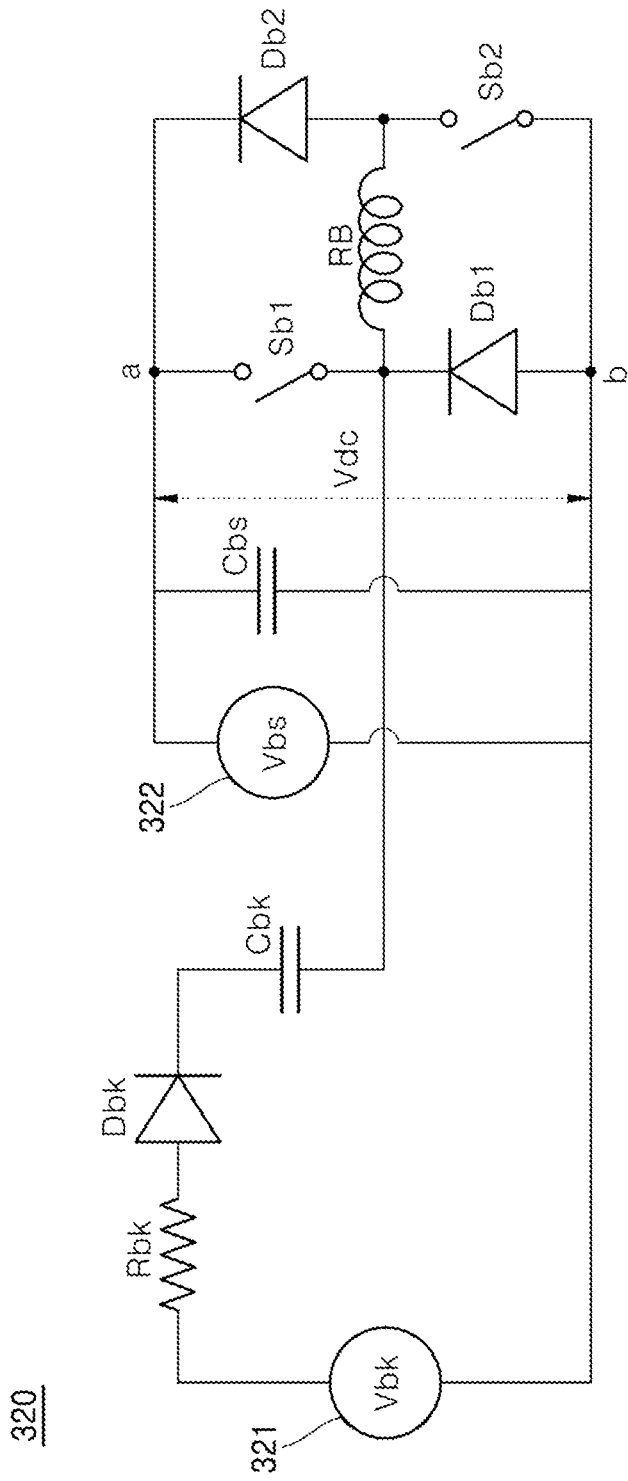
[FIG. 3]

[FIG. 4]
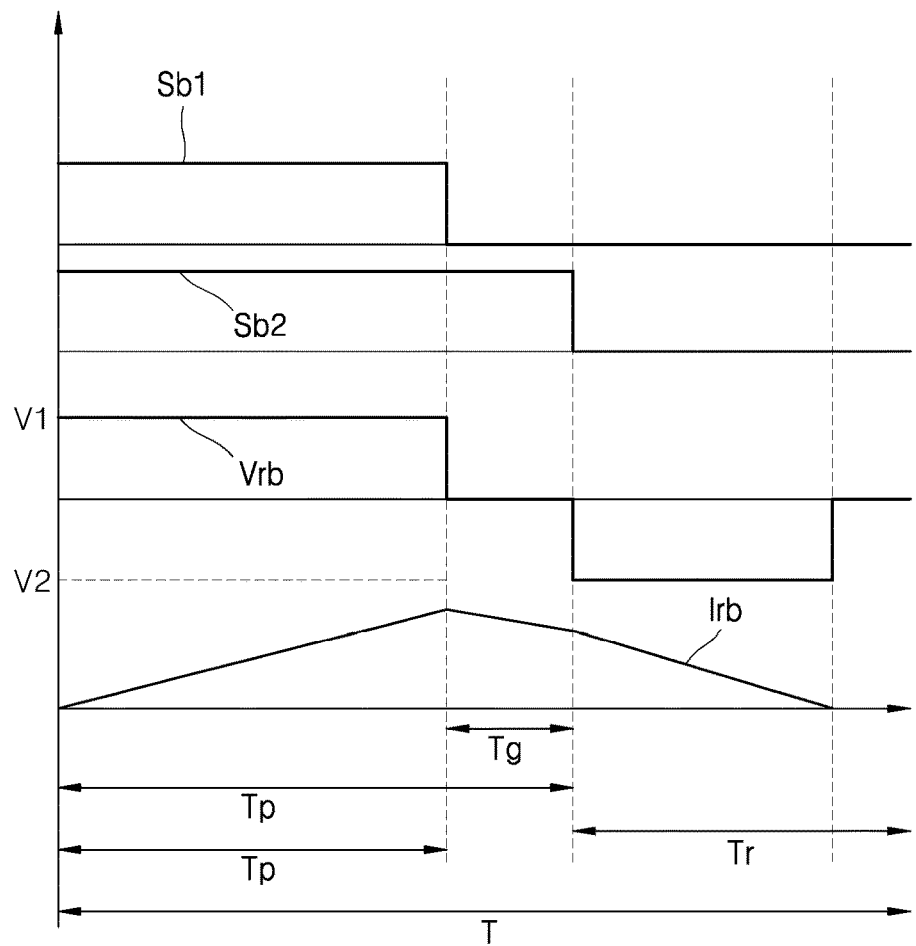
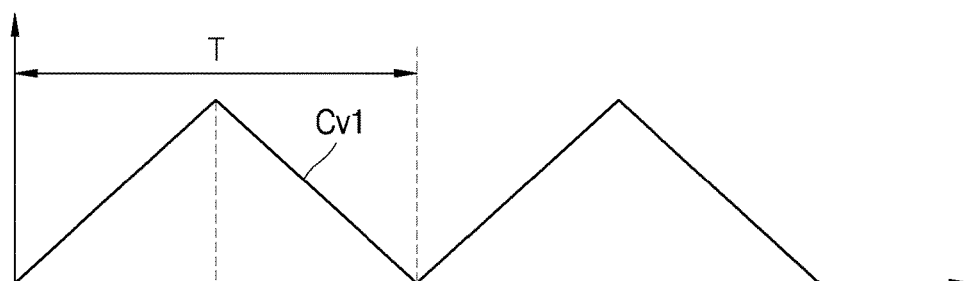
[FIG. 5(a)]
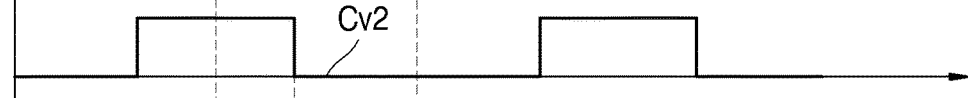
[FIG. 5(b)]
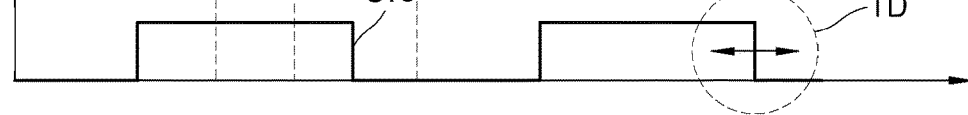
[FIG. 5(c)]

[FIG. 6]
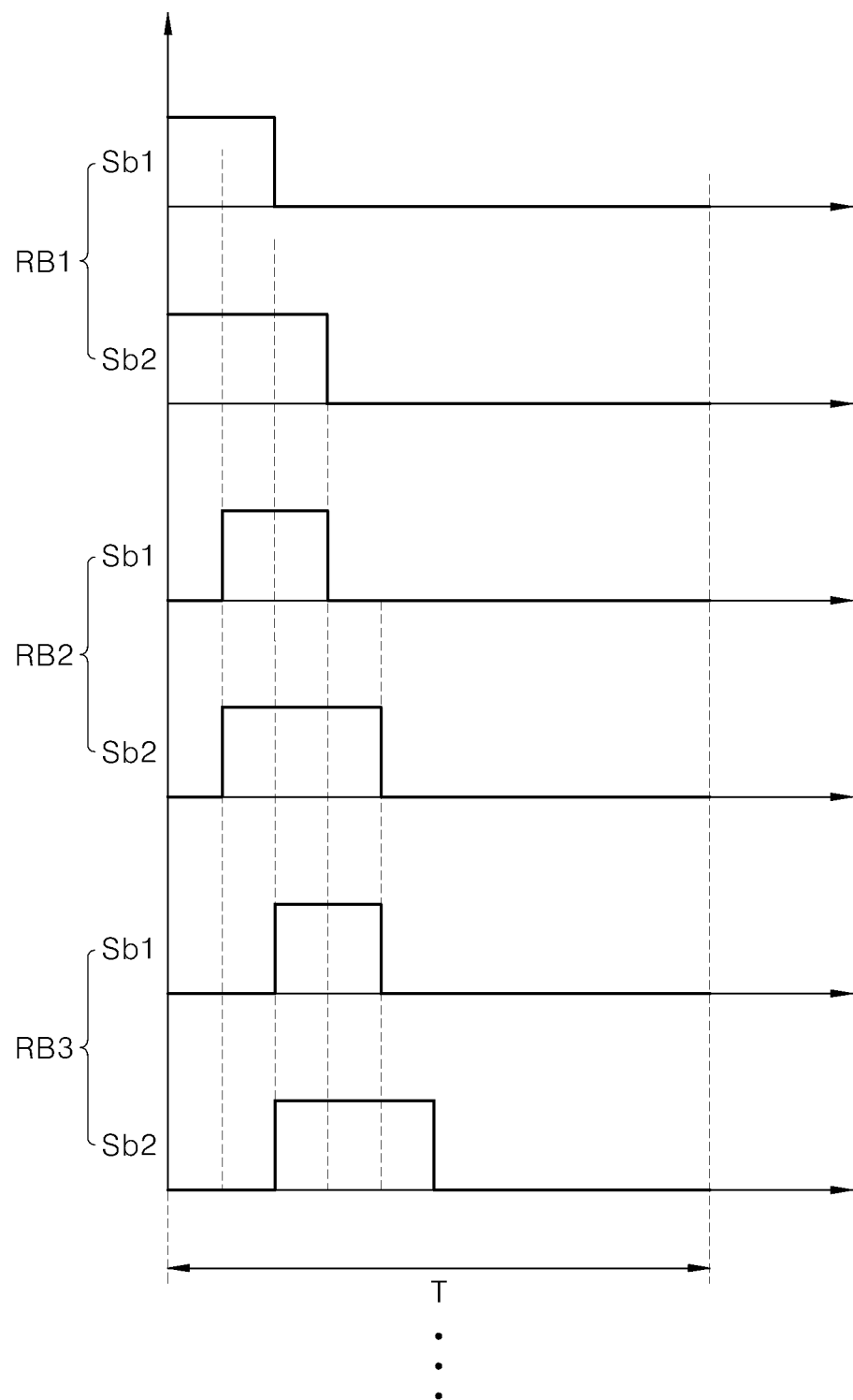

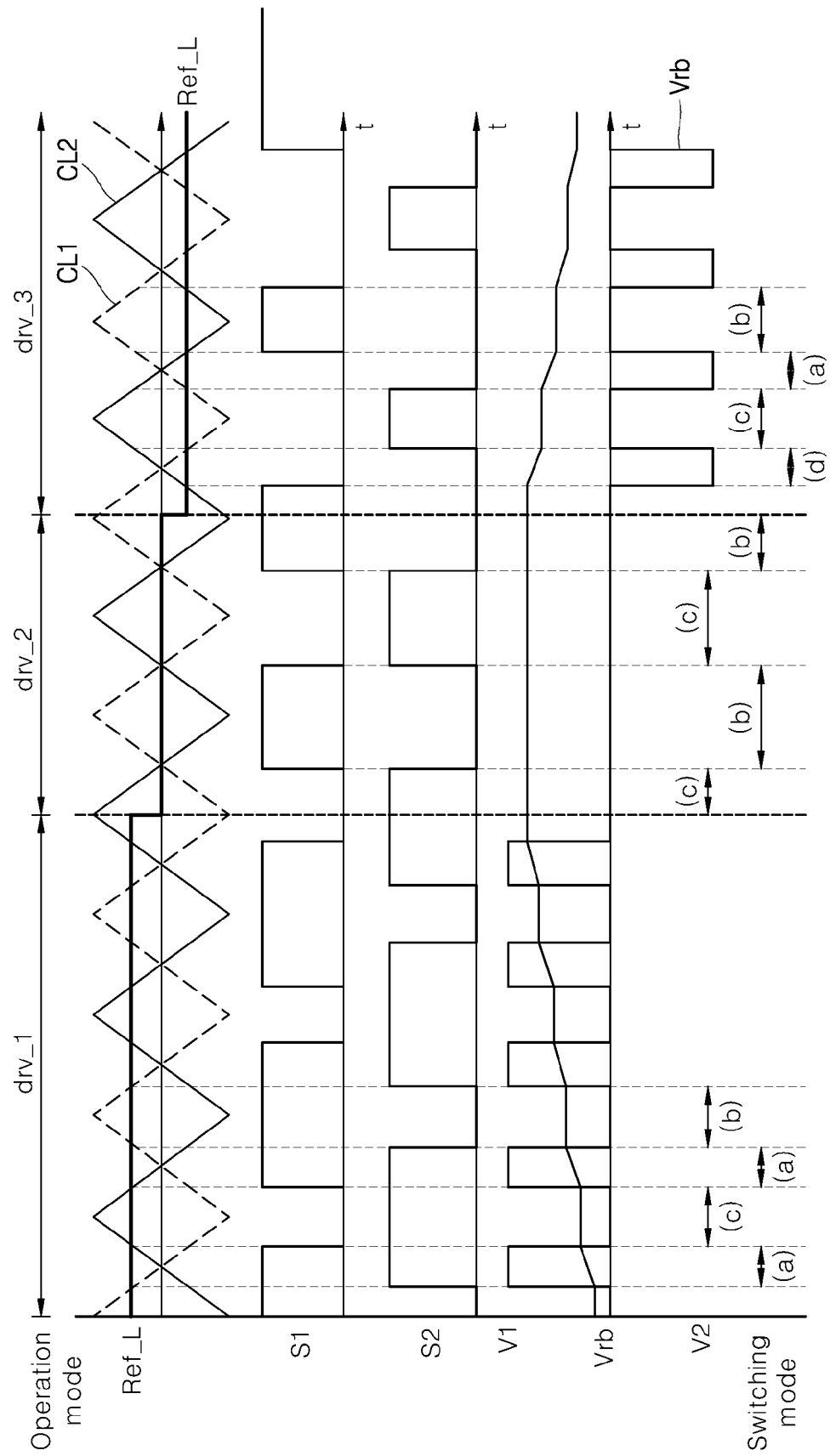
[FIG. 7]

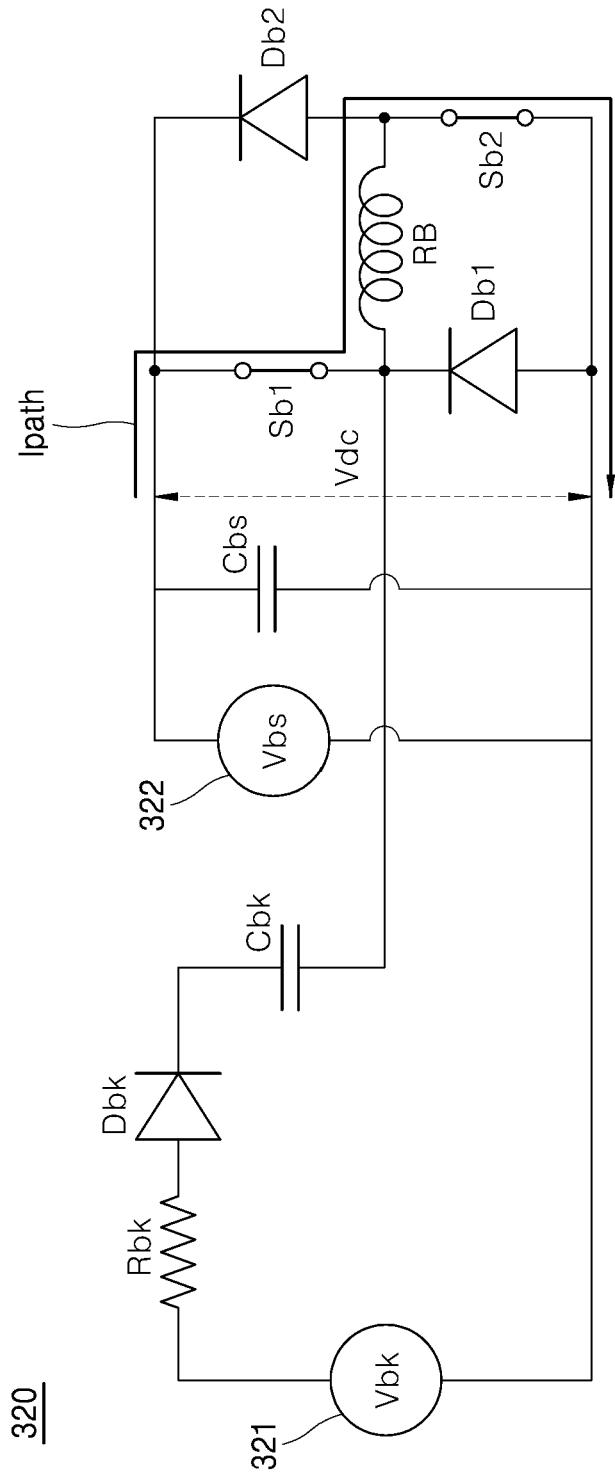
[FIG. 8]

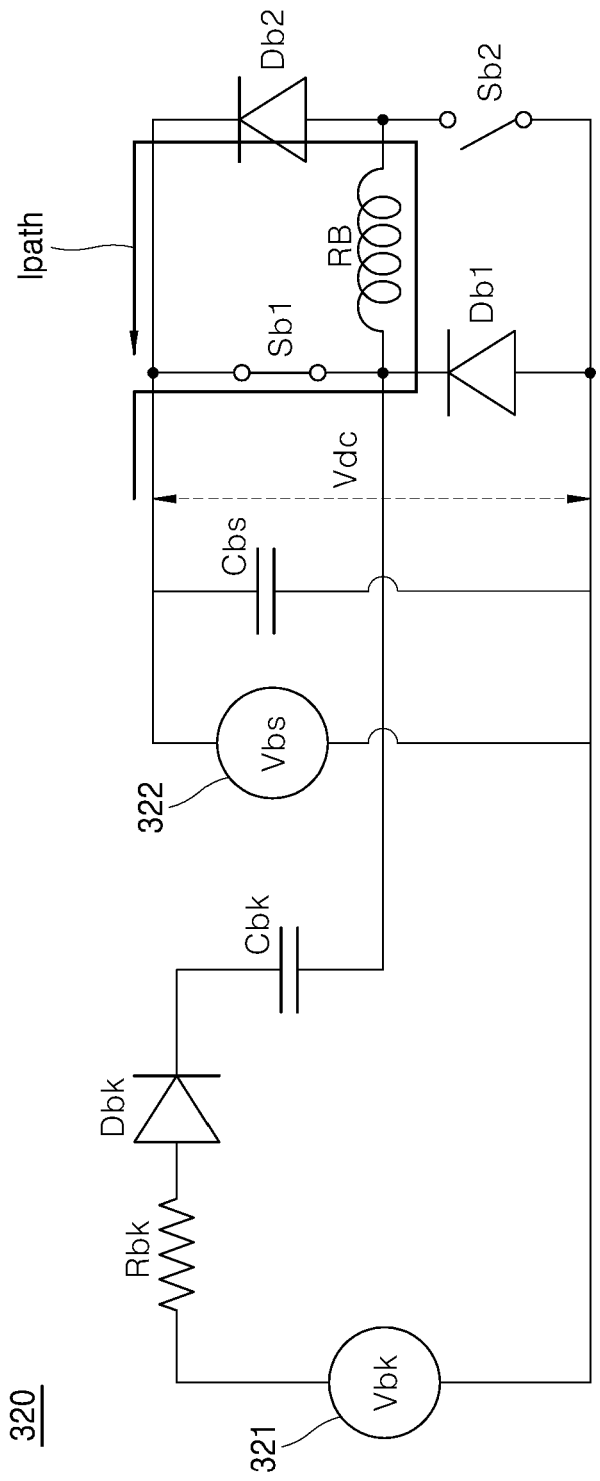
[FIG. 9]

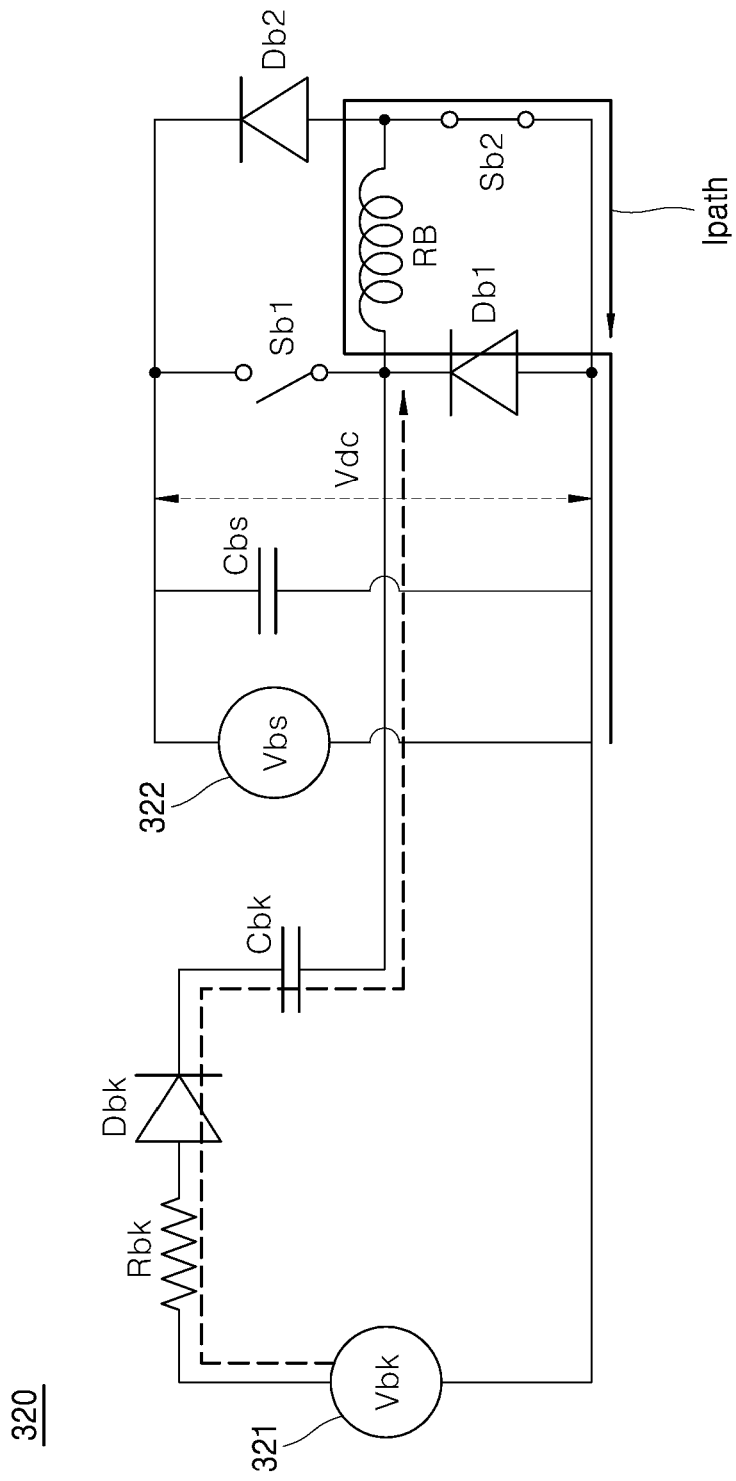
[FIG. 10]

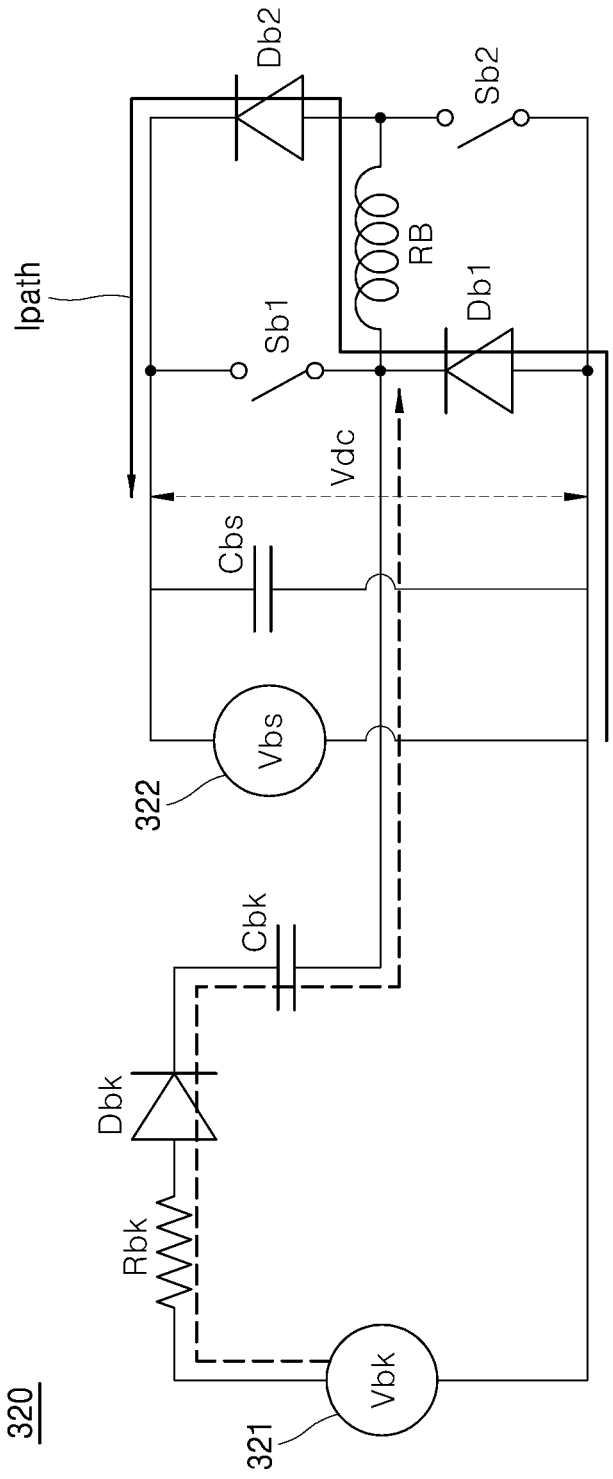
[FIG. 11]

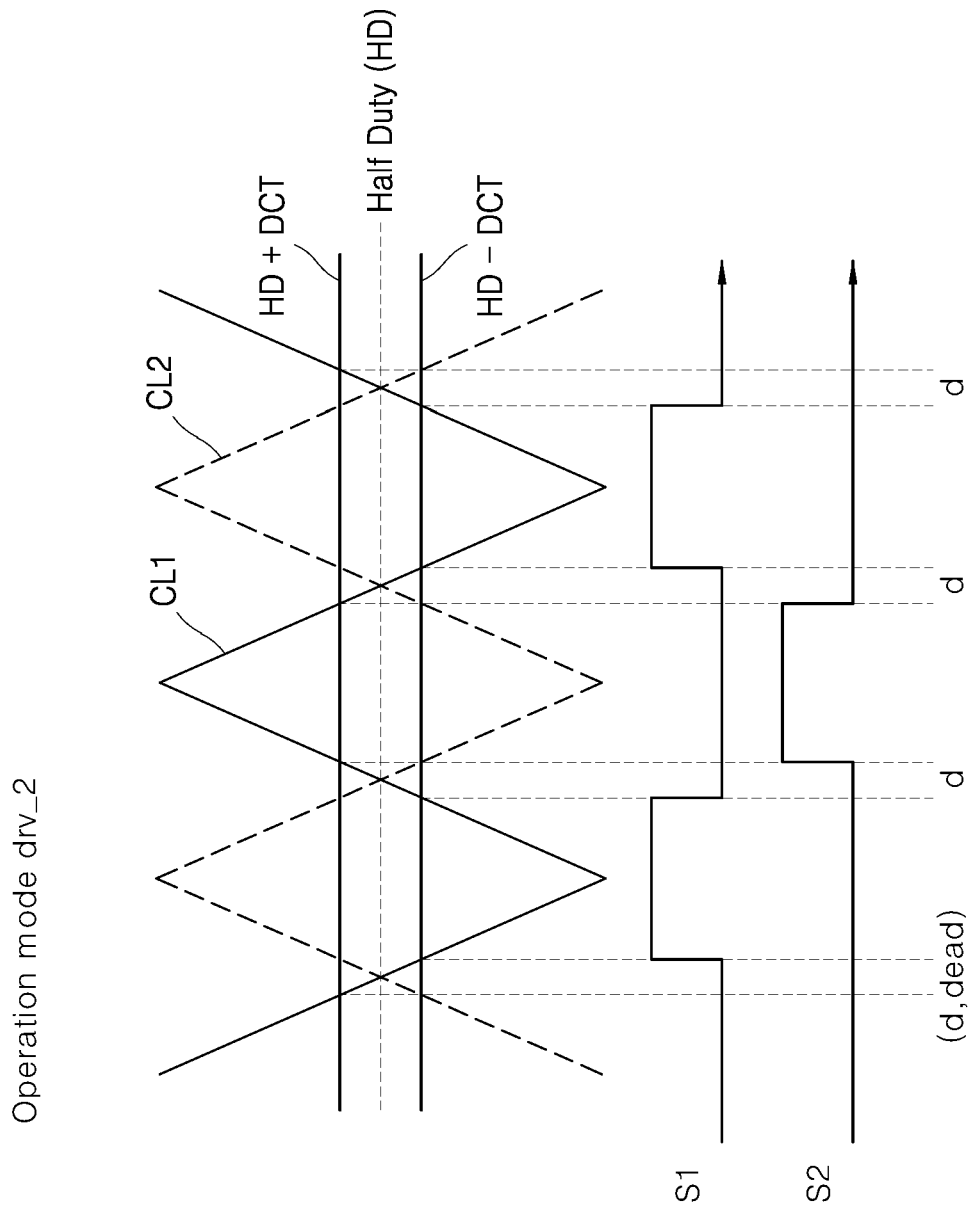
[FIG. 12]

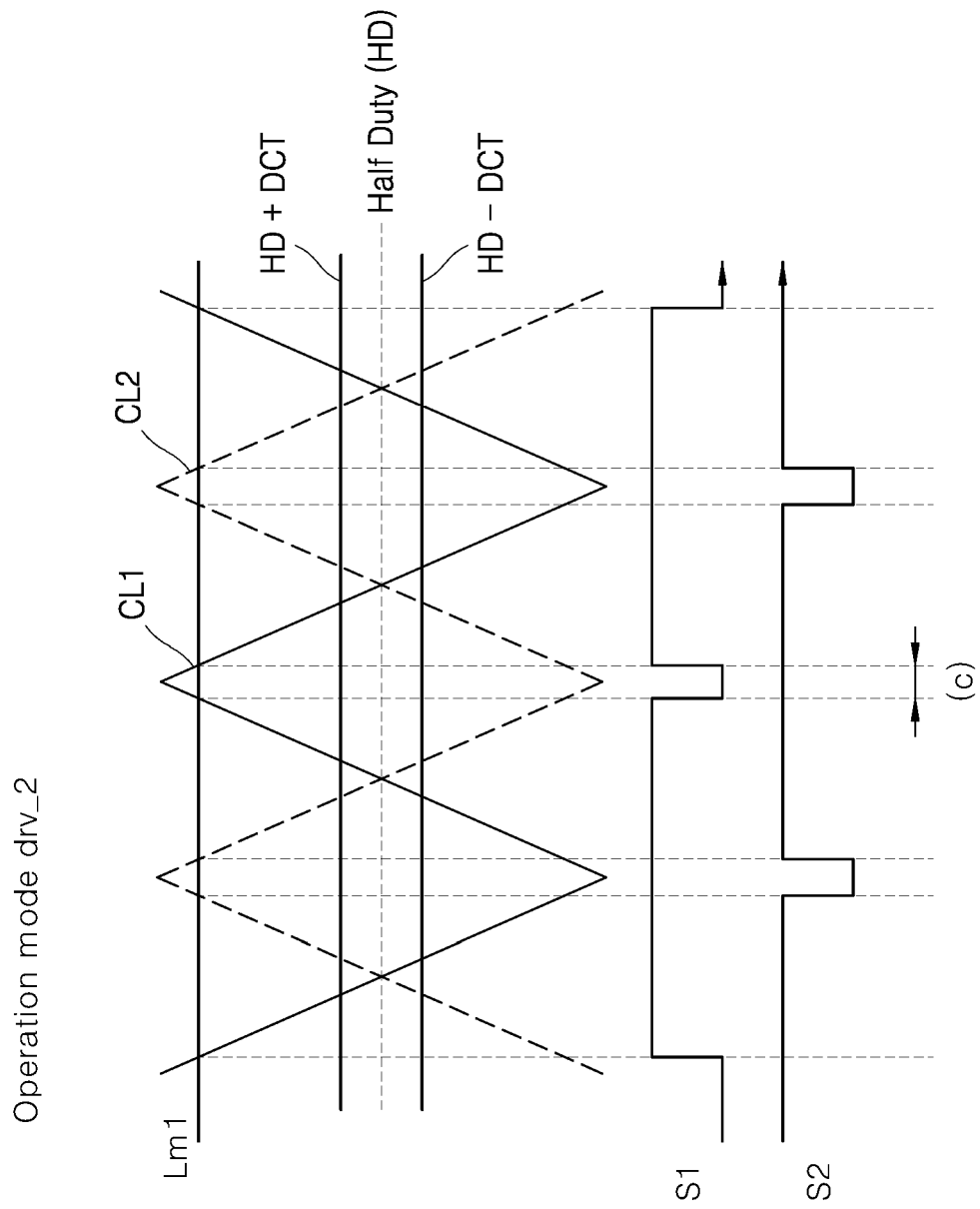
[FIG. 13]

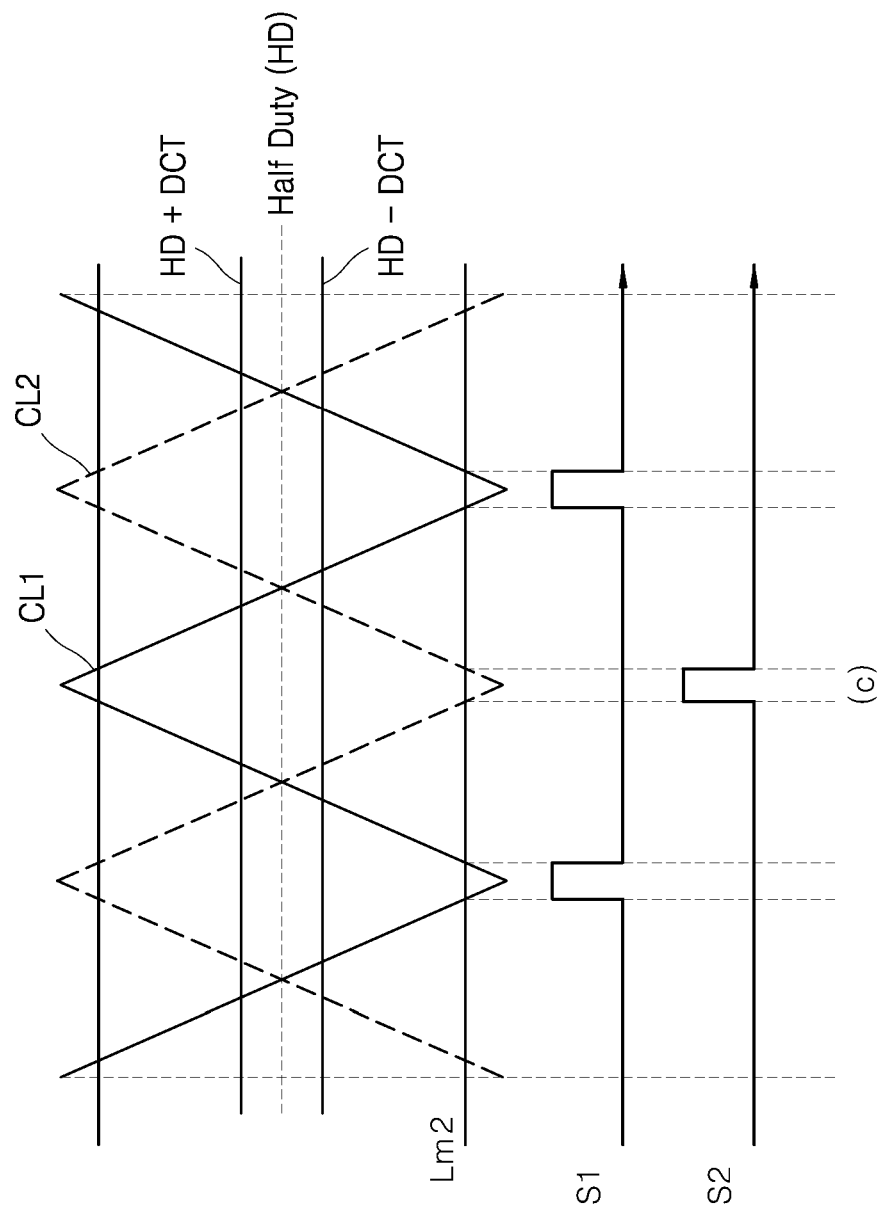
[FIG. 14]

MAGNETIC BEARING CONTROL DEVICE AND CONTROL METHOD

CROSS-REFERENCE TO RELATED PATENT APPLICATIONS

This application is a U.S. National Stage Application under 35 U.S.C. § 371 of PCT Application No. PCT/KR2019/000151, filed Jan. 4, 2019, which claims priority to Korean Patent Application No. 10-2018-0001656, filed Jan. 5, 2018, whose entire disclosures are hereby incorporated by reference.

FIELD

The present disclosure relates to a control device and a control method of a magnetic bearing capable of reducing power loss of a coil via improvement of a ripple of a coli current while simplifying a structure of a control circuit of a magnetic bearing having a magnetic levitation scheme.

DESCRIPTION OF RELATED ART

An air conditioner or a chiller for creating an indoor environment includes a compressor for compressing a refrigerant, a heat exchanger, and an evaporator. A bearing structure for minimizing a frictional force when driving a motor is applied to a double compressor and a heat exchanger.

A bearing that is variously applied to the compressors and the heat exchanger may minimize physical friction with a motor, a coil, and surrounding objects and, at the same time, keep movements between the objects smoother. The bearing is applied to various machinery fields in addition to the compressor and the heat exchanger.

Recently, magnetic bearings using magnetic lines or magnetic bearings bearing having a magnetic levitation scheme. have been developed. Since the magnetic bearing supports a target object with a magnetic force, there is no mechanical contact between the target object and the bearing.

For example, in a case where the magnetic bearing is applied to a motor of the compressor, a current passes through a magnetic bearing coil to form a magnetic force, and then a rotor of the motor of the compressor is held aloft using the magnetic force. Thus, even when the motor of the compressor is driven, the rotor may be rotated without mechanical friction. As such, the magnetic bearing has advantages such as no noise, no lubrication, and no regular maintenance and may overcome limitations of conventional contact bearings.

However, when driving the magnetic bearing, precise control thereof may be difficult. Further, control circuits corresponding to the number of target objects are required to complicate a circuit structure. Thus, an application cost thereof increases and improvement requirements thereof are various.

In an example, a control circuit for controlling the magnetic bearing is configured by connecting a number of positions in a full bridge scheme in a manner similar to a switching structure of an inverter driving a motor. The control circuit having the full bridge structure has a complicated control scheme for precisely and sequentially controlling a plurality of switching elements, while a structure of circuits to be added to secure a driving voltage of the switching elements is complicated.

In recent years, in order to simplify the structure of the full bridge circuit, a diode is used instead of a switching element at a specific position. A capacitor is additionally used to secure a driving voltage of the switching elements. However, an efficient charging method of the capacitor as added in order to secure the driving voltage of the switching elements is needed. Further, there is a need to improve a ripple as caused by on/off delay of the switching elements.

DISCLOSURE

Technical Purposes

A purpose of the present disclosure is to provide a control device and a control method magnetic bearing, in which a bootstrap capacitor of a magnetic bearing control circuit is efficiently charged such that a structure of a magnetic bearing control circuit is simplified.

Another purpose of the present disclosure is to provide a control device and a control method of a magnetic bearing, in which power loss of a magnetic bearing coil may be reduced via improving ripple of a coil current of a magnetic bearing control circuit.

Technical Solutions

In a magnetic bearing control device according to an embodiment of the present disclosure for achieving the purpose, a bearing controller outputs a plurality of switching control signals, based on gap information between a bearing coil and a rotor, and current information applied to the bearing coil. Moreover, a coil driver controls a current amount to be applied to the bearing coil to adjust a magnetic field intensity between the bearing coil and the rotor. In this connection, the bearing controller generates the plurality of switching control signals such that a charging time duration of a bootstrap capacitor of a coil driver is secured and transmits the signals to the coil driver.

A method for operating a magnetic bearing control device according to an embodiment of the present disclosure for achieving the purpose generates a plurality of switching control signals such that a charging time duration of a bootstrap capacitor of a coil driver that adjusts a magnetic field intensity between a bearing coil and a rotor is secured. In this connection, the plurality of switching control signals are generated so that a first operation mode in which the bearing coil and the bootstrap capacitor of the coil driver are charged is performed. Moreover, the plurality of switching control signals are varied so that a second operation mode in which a current amount applied to the bearing coil is maintained by the bootstrap capacitor of the coil driver. Next, the plurality of switching control signals are varied and output such that the bearing coil and the bootstrap capacitor of the coil driver are discharged in a stepwise manner.

Technical Effects

In the control device and the control method of the magnetic bearing according to the embodiments of the present disclosure, the plurality of switching control signals may be generated so that the charging time duration of the bootstrap capacitor of the coil driver is secured. This allows the bootstrap capacitor to be efficiently charged. Thus, a structure of a magnetic bearing control circuit is simplified due to the added bootstrap capacitor.

Moreover, in the control device and the control method of the magnetic bearing according to the embodiments of the present disclosure, coil current supply is limited on a preset period basis when the magnetic bearing control circuit is controlled to be turned on/off. Accordingly, the ripple of the coil current of the magnetic bearing control circuit may be suppressed and thus the power loss of the magnetic bearing coil may be reduced.

BRIEF DESCRIPTION OF THE DRAWINGS

FIG. 1 is a block diagram showing a magnetic bearing control device according to an embodiment of the present disclosure.

FIG. 2 is a block diagram specifically showing a bearing controller shown in FIG. 1.

FIG. 3 is a circuit diagram specifically showing a circuit configuration of a coil driver shown in FIG. 1.

FIG. 4 is a timing diagram showing change in an input signal input to the coil driver in FIG. 3 and thus change in an internal current thereof.

FIGS. 5(a), 5(b) and 5(c) are timing diagrams for illustrating a duty command value generated by a duty generator in FIG. 2.

FIG. 6 is a timing diagram for illustrating turn-on timing of each of first and second switching elements shown in FIG. 3.

FIG. 7 is another timing diagram showing change in an input signal input to the coil driver in FIG. 3 and thus change in an internal current thereof.

FIG. 8 is a circuit diagram showing a current flow during a control period of a first switching mode among switching modes shown in FIG. 7.

FIG. 9 is a circuit diagram showing a current flow during a control period of a second switching mode among switching modes shown in FIG. 7.

FIG. 10 is a circuit diagram showing a current flow during a control period of a third switching mode among switching modes shown in FIG. 7.

FIG. 11 is a circuit diagram showing a current flow during a control period of a fourth switching mode among switching modes shown in FIG. 7.

FIG. 12 is a timing diagram showing a generation and output scheme of first and second switching signals during a control period of a second operation mode among operation modes shown in FIG. 7.

FIG. 13 is another timing diagram showing a generation and output scheme of first and second switching signals during a control period of a first operation mode among operation modes shown in FIG. 7.

FIG. 14 is another timing diagram showing a generation and output scheme of first and second switching signals during a control period of a third operation mode among operation modes shown in FIG. 7.

DETAILED DESCRIPTIONS

The terms or words used in the present specification and claims should not be interpreted as being limited to have ordinary or dictionary meanings. Rather, the terms or words used in the present specification and claims should be interpreted as meanings and concepts consistent with a technical idea of the present disclosure, based on a principle that the present inventor may properly define concept of a term in order to best describe the present disclosure.

Moreover, configurations disclosed in embodiments described in the present specification and shown in the drawings are only preferred embodiments of the present disclosure and are not intended to represent an entire coverage of the technical spirit of the present disclosure. Thus, it is to be understood that there may be various equivalents and modifications that may replace the above configurations when the present application is filed.

Hereinafter, a control device and a control method of a magnetic bearing according to the present disclosure will be described in detail with reference to the accompanying drawings.

FIG. 1 is a block diagram showing a magnetic bearing control device according to an embodiment of the present disclosure.

A magnetic bearing control device 300 shown in FIG. 1 includes a gap sensor 330, a current detector M, a bearing controller 310, and a coil driver 320.

The magnetic bearing 100 which may be generally disposed in a heat exchanger or a compressor includes at least one motor 110 performing a rotational operation of a rotor, and a bearing coil 120 assembled in a correspond manner to a rotor of a corresponding motor 110. Accordingly, the magnetic bearing control device 300 controls a magnetic field intensity of the bearing coil 120 in real time to adjust landing and levitation of the rotor (not shown) of the motor 110.

The bearing controller 310 may receive gap information GP between the bearing coil 120 and the motor rotor from at least one the gap sensor 330 disposed around the bearing coil 120. Moreover, the bearing controller 310 may receive current information IB applied to the bearing coil 120 from a current detector M.

The bearing controller 310 outputs a plurality of switching control signals Sci for controlling the coil driver 320, based on the received gap information GP and current information IB.

The bearing controller 310 may control the rotor of the motor 110 to softly take off above from the bearing coil 120. To this end, the bearing controller 310 may generate and output the plurality of switching control signals Sci to gradually increase a charged amount of each of the bearing coil 120 and a bootstrap capacitor of the coil driver 320. Thus, a first operation mode may be executed.

Subsequently, the bearing controller 310 may vary and output the switching control signals Sci so that a second operation mode in which the current amount applied to the bearing coil 120 is maintained by the bootstrap capacitor of the coil driver 320 is performed.

To the contrary, the bearing controller 310 may control the rotor of the motor 110 to softly land on the bearing coil 120. To this end, the bearing controller 310 may generate and output the plurality of switching control signals Sci such that each of the bearing coil 120 and the bootstrap capacitor of the coil driver 320 is discharged in a stepwise manner. Thus, a third operation mode is performed.

The coil driver 320 may perform turn-on/off control of a plurality of switching elements formed therein, based on the plurality of switching control signals Sci. When controlling the turn on/off of switching elements in the coil driver 320, the current amount applied to the bearing coil 120 may be controlled to allow the magnetic field to be generated or removed from the bearing coil 120. In this way, when the coil driver 320 adjusts the magnetic field intensity of the bearing coil 120, the landing and levitation of the rotor of the motor 110 may be controlled in real time.

FIG. 2 is a block diagram specifically showing the bearing controller shown in FIG. 1.

The bearing controller 310 shown in FIG. 2 includes a current command generator 315 and a duty generator 316.

Specifically, the current command generator 315 generates a current command value IBi, based on the gap information Gp from the gap sensor 330 and a preset gap command value Gpi. For example, the current command generator 315 may generate a current command value IBi for performing current amount control of the bearing coil 120, based on a difference between the gap information Gp and the gap command value Gpi. To this end, the current command generator 315 includes a first calculator 311, and a first controller 312.

The first calculator 311 outputs the difference value between the gap information Gp from the gap sensor 330 and the preset gap command value Gpi.

The first controller 312 generates and outputs the current command value IBi for controlling the current amount of the bearing coil 120, based on the difference value between the gap information Gp and the gap command value Gpi.

The current command generator 315 may further include a limiter that is configured to limit a level of the current command value IBi so that the current command value IBi does not exceed a preset allowable range.

The duty generator 316 may generate a duty command value for controlling an on/off duty of each of the switching elements disposed in the coil driver 320, based on the current information IB from the current detector M and the current command value IBi from the current command generator 315. Specifically, the duty generator 316 generates a duty command value for controlling on/off of each of the switching elements disposed in the coil driver 320 for each switching element, based on a difference between the current information IB and the current command value IBi. Moreover, the duty generator 316 generates the plurality of switching control signals Sci in a corresponding manner to each duty command value for each switching element. To this end, the duty generator 316 may include a second calculator 313 and a second controller 314.

The second calculator 313 outputs the difference value between the current information IB from the current detector M and the current command value IBi from the current command generator 315.

The second controller 314 generates the duty command value for controlling on/off of each of the switching elements arranged in the coil driver 320 for each switching element, based on the difference value between the current information IB and the current command value IBi. The second controller 314 generates the plurality of switching control signals Sci in a corresponding manner to each duty command value for each switching element.

The duty generator 316 may further include a limiter that is configured to limit a level of the duty command value so that the duty command value does not exceed a preset allowable range.

When the gap between the bearing coil 120 and the rotor of the magnetic bearing 100 is smaller than the preset gap command value Gpi, the bearing controller 310 having the above-described configuration may output a switching control signals Sci having an increased duty to increase the gap. In this connection, the switching control signal Sci having an increased duty may mean having an increased switching period and having an increased duty within the increased switching period. Alternatively, the switching control signals Sci having the increased duty may mean having an increased duty within a constant switching period.

In another example, when the gap between the bearing coil 120 and the rotor of the magnetic bearing 100 is greater than the preset gap command value Gpi, the bearing controller 310 may output a switching control signals Sci having an decreased duty to reduce the gap.

According to the operation of the bearing controller 310, when the rotor rotates, the gap may be kept constant.

Moreover, the bearing controller 310 may output the switching control signals Sci having the increased duty so that the gap between the bearing coil 120 and the rotor may be increased in a stepwise manner when the rotor takes off from the coil 120.

Conversely, the bearing controller 310 may output the switching control signals Sci having the decreased duty so that the gap between the bearing coil 120 and the rotor may be reduced in a stepwise manner when the rotor lands on the coil 120.

The bearing controller 310, in particular, the second controller 314 of the bearing controller 310 may vary and output a switching control signal Sci to perform the first operation mode to gradually increase the charged amount of each of the bearing coil 120 and the bootstrap capacitor of the coil driver 320. Moreover, the second controller 314 may output a switching control signals Sci such that the second operation mode in which the current amount applied to the bearing coil 120 is maintained by the bootstrap capacitor of the coil driver 320 is performed. Moreover, the second controller 314 may vary and output a switching control signal Sci to perform the third operation mode in which each of the bearing coil 120 and the bootstrap capacitor of the coil driver 320 is discharged in a stepwise manner. Accordingly, when the motor 110 is stopped in a magnetic levitation state, the rotor of the motor 110 may softly land on the coil 120. Therefore, damage to the rotor of the motor 110 may be prevented. In addition, damage to the magnetic bearing 100, the gap sensor 330, and the like may be prevented.

FIG. 3 is a circuit diagram specifically showing a circuit configuration of the coil driver shown in FIG. 1.

In the coil driver 320 shown in FIG. 3, a first capacitor Cbs for charging/discharging a first DC power supply (Vbs) 322 is connected in parallel to DC ends (nodes a and b) of the first DC power supply (Vbs) 322. A first switching element Sb1 and a first diode element Db1 are connected to each other in series. A serial combination thereof is connected in parallel to both ends (nodes a and b) of the first capacitor Cbs. Moreover, a second diode element Db2 and a second switching element Sb2 are connected in series are connected to each other in series. A serial combination thereof is connected in parallel to a serial combination of the first switching element Sb1 and the first diode element Db1.

The bearing coil (RB) 120 may be electrically connected to and disposed between a first node between the first switching element Sb1 and the first diode element Db1, and a second node between the second diode element Db2 and the second switching element Sb2.

Moreover, a second capacitor Cbk for charging/discharging a second DC power supply (Vbk) 321 may be connected to a node between the first switching element Sb1 and the first diode element db1. Moreover, a resistance element Rbk and a third diode Dbk may be connected to and disposed between the second DC power supply (Vbk) 321 and the second capacitor Cbk.

In order to secure a driving voltage of the first switching element Sb1, the bearing controller 310 may perform a bootstrap operation such that power from the second DC power supply Vbk is charged into the second capacitor Cbk. For example, even when the first switching element Sb1 is turned off and when the second switching element Sb2 is turned on, the bootstrap operation in which power from the second DC power supply Vbk is charged to the second capacitor Cbk may be performed.

As shown in FIG. 3, the bearing controller 310 drives the first switching element Sb1 and the second switching element Sb2 separately, thereby to secure the driving voltage of the first switching element Sb1 using the second capacitor Cbk in a simple and efficient manner. That is, the bootstrap operation may allow securing the driving voltage of the first switching element Sb1 using the power from the second DC power supply Vbk as stored in the second capacitor Cbk.

In one example, the bearing controller 310 is preferably controlled so that the bootstrap operation time duration is equal to or greater than a preset minimum reference time duration. In this connection, a voltage charging time of the second capacitor Cbk may be determined based on a RC time constant and thus may be determined based on a capacitance of the second capacitor Cbk and a resistance value of the resistance element Rbk.

Moreover, the bearing controller 310 may vary the bootstrap operation time duration, based on the capacitance of the second capacitor Cbk and the resistance value of the resistance element Rbk. Thus, a sufficient bootstrap operation time duration may be secured, and thus the driving voltage of the first switching element Sb1 may be secured.

FIG. 4 is a timing diagram showing change in the input signal input to the coil driver in FIG. 3 and change in an internal current therein.

Referring to FIG. 4 together with FIG. 3, for a Tp period, both the first switching element Sb1 and the second switching element Sb2 are turned on.

To the contrary, for a Tg period, the first switching element Sb1 is turned off, and the second switching element Sb2 is turned on.

In other words, the second switching element Sb2 is turned on for the Tp period. For a Tr period, both the first switching element Sb1 and the second switching element Sb2 are turned off. The bootstrap operation is performed for the Tg period and the Tp period, so that the driving voltage of the first switching element Sb1 may be secured efficiently.

As described above, for the Tg period, the bootstrap operation is performed. Thus, it is preferable that the Tg period is equal to or greater than a preset minimum reference time duration.

FIG. 10 is a timing diagram for illustrating the duty command value generated from the duty generator of FIG. 2.

(a) in FIG. 5 shows a triangular waveform CV1 corresponding to a period T for generation of the duty command value. (b) in FIG. 5 is a waveform representing a duty command value CV2 for the first switching element Sb1. (c) in FIG. 5 is a waveform showing a duty command value CV3 for the second switching element Sb2.

As a difference between a high level of the duty command value CV2 for the first switching element Sb1 and a high level of the duty command value CV3 for the second switching element Sb2 is larger, the driving voltage of the first switching element Sb1 may be secured more efficiently.

FIG. 6 is a timing diagram for illustrating a turn-on timing of each of the first and second switching elements shown in FIG. 3.

As described above, the number of the bearing coils 120 is proportion to the number of the motors 110. Thus, the number of the bearing coils 120 may be configured to correspond to the number of magnetic bearings 100 disposed in a compressor or a heat exchanger.

Accordingly, it is preferable that the first switching elements Sb1 and the second switching elements Sb2 whose number corresponds to the number of magnetic bearings 100 are not simultaneously but sequentially turned on as shown in FIG. 6. As a result, a peak current at a switching time decreases, and a likelihood of burnout of the circuit element decreases.

FIG. 7 is another timing diagram showing change in the input signal input to the coil driver in FIG. 3 and change in the internal current therein.

As shown in FIG. 7, when operating the coil driver 320, the bearing controller 310, in particular, the second controller 314 of the bearing controller 310 may activate the coil driver 320 in each of the first to third operation modes drv_1, drv_2, and drv_3.

Moreover, during a period of activating the coil driver 320 in each of the first to third operation modes drv_1, drv_2, and drv_3, the second controller 314 may output a switching control signal Sci so that at least one of first to fourth switching modes a, b, c, and d for switching the first and second switching elements Sb1 and Sb2 of the coil driver 320 respectively is selectively applied.

Specifically, during a period of activating the coil driver 320 in the first operation mode, the second controller 314 may be controlled such that a charged amount of each of the bearing coil 120 and the second capacitor Cbk as a bootstrap capacitor of the coil driver 320 gradually increases. That is, the first operation mode is configured for charging the bootstrap capacitor of the coil driver 320.

During a period of activating the coil driver 320 in the first operation mode, the second controller 314 may output the switching control signals Sci such that the first to fourth switching modes for switching the first and second switching elements Sb1 and Sb2 of the coil driver 320 respectively are activated in an order of the first, third, first, and second switching modes (a-c-a-b).

When outputting a first switching signal Si for controlling the first switching element Sb1 among the switching control signals Sci, the second controller 314 may output the first switching signal S1 as a turn-on signal for a period for which a voltage level of a first carrier signal CL1 swinging at a preset frequency is lower than that of a preset reference signal Ref_L.

When outputting a second switching signal S2 for controlling the second switching element Sb2 among the switching control signals Sci, the second controller 314 may output the second switching signal S2 as a turn-on signal for a period for which a voltage level of a second carrier signal CL2 whose phase is opposite to that of the first carrier signal CL1 is lower than that of the preset reference signal Ref_L.

A voltage level of the preset reference signal Ref_L may vary based on the first to third operation modes drv_1, drv_2, and drv_3. For example, the voltage level of the reference signal Ref_L in the second operation mode drv_2 may be 50% of the voltage level of each of the first and second carrier signals CL1 and CL2. To the contrary, the voltage level of the reference signal Ref_L in the first operation mode drv_1 may be higher than 50% of the voltage level of each of the first and second carrier signals CL1 and CL2. Moreover, the voltage level of the reference signal Ref_L in the third operation mode drv_3 may be lower than 50% of the voltage level of each of the first and second carrier signals CL1 and CL2.

Subsequently, during a period of activating the coil driver 320 in the second operation mode, the second controller 314 is controlled such that the current amount applied to the bearing coil 120 is maintained by repeated charging/discharging of the second capacitor Cbk as the bootstrap capacitor of the coil driver 320. That is, the second operation mode drv_2 refers to a mode in which the current amount applied to the bearing coil 120 is maintained by the repeated charging/discharging of the second capacitor Cbk.

For a period for which the coil driver 320 is activated in the second operation mode drv_2, the second controller 314 may output the switching control signals Sci such that the first to fourth switching modes for switching the first and second switching elements Sb1 and Sb2 of the coil driver 320 respectively are activated in an order of the second, third, second and third switching modes of the modes (c-b-c-b).

Subsequently, during a period of activating the coil driver 320 in the third operation mode drv_3, the second controller 314 may vary and out the switching control signal Sci so that the second capacitor Cbk as the bootstrap capacitor of the coil driver 320 is discharged in a stepwise manner That is, the third operation mode drv_3 refers to a mode for discharging the bootstrap capacitor of the coil driver 320.

During a period of activating the coil driver 320 in the third operation mode drv_3, the second controller 314 may output the switching control signals Sci such that the first to fourth switching modes for switching the first and second switching elements Sb1 and Sb2 of the coil driver 320 respectively are activated in an order of the fourth, third, first and second (d-c-a-b).

FIG. 8 is a circuit diagram showing a current flow during a control period of the first switching mode among the switching modes shown in FIG. 7.

Among the first to fourth switching modes for switching the first and second switching elements Sb1 and Sb2, the first switching mode (a) is repeatedly performed for an activation period drv_1 of the first operation mode.

In the first switching mode (a), the first and second switching elements Sb1 and Sb2 are turned on to increase the coil current of the bearing coil 120.

As shown in FIG. 8, in a control state of the first switching mode (a), the current from the first DC power supply (Vbs) 322 is charged to the first capacitor Cbs and is transmitted to the bearing coil (RB) 120 via the first switching element Sb1. In this case, the current from the first DC power supply (Vbs) 322 flows through the first switching element Sb1 and the bearing coil (RB) 120 toward the second switching element Sb2 and thus is a forward current toward a lower potential side.

FIG. 9 is a circuit diagram showing a current flow during a control period of the second switching mode among the switching modes shown in FIG. 7.

Among the first to fourth switching modes for switching the first and second switching elements Sb1 and Sb2, the second switching mode (b) is selectively performed for each of activation periods of the first to third operation modes drv_1, drv_1, and drv_3.

Thus, the second switching mode (b) refers to a control state in which only the first switching element Sb1 among the first and second switching elements Sb1 and Sb2 is turned on to maintain the coil current of the bearing coil 120.

As shown in FIG. 9, in the control state of the second switching mode (b), the current from the first DC power supply (Vbs) 322 is transmitted to the bearing coil (RB) 120 via the first switching element Sb1. In this case, the current from the first DC power supply (Vbs) 322 flows toward the second diode element Db2 via the first switching element Sb1 and the bearing coil (RB) 120, so that the coil current of the bearing coil 120 is maintained in a free-wheeling state.

FIG. 10 is a circuit diagram showing a current flow during a control period of the third switching mode among the switching modes shown in FIG. 7.

Among the first to fourth switching modes for switching the first and second switching elements Sb1 and Sb2, the third switching mode (c) is selectively performed for each of the activation periods of the first to third operation modes drv_1, drv_1, and drv_3. The third switching mode (c) may be performed in an alternating manner with the second switching mode (b).

Thus, the third switching mode (c) refers to a control state in which only the second switching element Sb2 among the first and second switching elements Sb1 and Sb2 is turned on to maintain the coil current of the bearing coil 120.

As shown in FIG. 10, in the control state of the third switching mode (c), the current from the second DC power supply Vbk is charged to the second capacitor Cbk as a bootstrap capacitor, and is applied to the bearing coil RB, 120. Accordingly, the current of the bearing coil (RB) 120 flows in a direction toward the second switching element Sb2 and the first diode element Db1 to form a closed circuit, so that the coil current of the bearing coil 120 is maintained in a free-wheeling state.

Since the execution period of the third switching mode (c) may correspond to a period during which the second capacitor Cbk as the bootstrap capacitor is charged, it is preferable that the control period of the third switching mode (c) is secured to be larger than or equal to a predetermined minimum reference time duration.

FIG. 11 is a circuit diagram showing a current flow during a control period of the fourth switching mode (d) among the switching modes shown in FIG. 7.

Among the first to fourth switching modes for switching the first and second switching elements Sb1 and Sb2, the fourth switching mode (d) is repeatedly performed in an activation period drv_3 of the third operation mode.

In the fourth switching mode (d), both of the first and second switching elements Sb1 and Sb2 are turned off such that the coil current of the bearing coil 120 is discharged.

As shown in FIG. 11, in the control state of the fourth switching mode (d), the current from the first capacitor Cbs is discharged and the current of the bearing coil (RB) 120 is discharged through the first and second diode elements Db1 and Db2.

FIG. 12 is a timing diagram showing a generation and output scheme of the first and second switching signals during a control period of the second operation mode among the operation modes shown in FIG. 7.

As shown in FIG. 12, during the activation period of the second operation mode drv_2, the third switching mode (c) and the second switching mode (b) are alternately performed with each other. Therefore, in the activation period of the second operation mode drv_2, the first switching element Sb1 and the second switching element Sb2 are turned on/off repeatedly in opposite operations to each other. In this way, the first switching element Sb1 and the second switching element Sb2 are turned on/off repeatedly in the opposite operations to each other, such that the coil current of the bearing coil 120 may be maintained. However, the on/off operations of the first and second switching elements Sb1 and Sb2 are not accurately performed without delay and the current flow gradually decreases or increases according to the on/off operations, such that the ripple may occur in the coil current of the bearing coil 120.

The bearing controller 310, in particular, the second controller 314 of the bearing controller 310 may output the second switching signals S1 and S2 such that the first and second switching elements Sb1 a and Sb2 are turned off concurrently for a dead period (d) for which the turn-on/off operations of the first and second switching elements Sb1 and Sb2 cross each other. To this end, the second controller 314 sets ±gain values (±DCT) around the 50% voltage level of each of the first and second carrier signals CL1 and CL2, so that a band voltage range in which the first and second switching elements Sb1 and Sb2 are turned off concurrently. Moreover, a period in which the voltage level of each of the first and second carrier signals CL1 and CL2 is included in the band voltage range is recognized as the dead period (d) in which the turn-on/off operations of the first and second switching elements Sb1 and Sb2 cross each other. Subsequently, during the dead period, the second controller 314 may output the first and second switching signals S1 and S2 so that the first and second switching elements Sb1 and Sb2 are simultaneously turned off. Accordingly, ripple occurrence of the coil current in the bearing coil 120 may be prevented.

FIG. 13 is another timing diagram showing a generation and output scheme of the first and second switching signals during a control period of the first operation mode among the operation modes shown in FIG. 7.

As described above, when outputting the first switching signal S1 for controlling the first switching element Sb1 among the switching control signals Sci, the second controller 314 may output the first switching signal S1 as a turn-on signal for a period for which a voltage level of the first carrier signal CL1 swinging at a preset frequency is lower than that of the preset reference signal Ref_L. Accordingly, the higher the voltage level of the reference signal Ref_L, the longer the turn-on period of the first switching element Sb1.

When the turn-on period of the first switching element Sb1 becomes longer, the coil current continues to rise up. Thus, it is necessary to suppress the coil current rise. Therefore, the second controller 314 sets a high limit level Lm1 so that the voltage level of the reference signal Ref_L is included in a range below the high limit level Lm1.

Due to the high limit level Lm1, the second controller 314 allows the turn-off period of the first and second switching elements Sb1 and Sb2 to be secured. This may allow securing a charging time duration of an operating voltage of the first switching element Sb1 while suppressing the rise of the coil current.

FIG. 14 is another timing diagram showing a generation and output scheme of the first and second switching signals during a control period of the third operation mode among the operation modes shown in FIG. 7.

As described above, when outputting the second switching signal S2 for controlling the second switching element Sb2 among the switching control signals Sci, the second controller 314 may output the second switching signal S2 as a turn-on signal for a period for which a voltage level of the second carrier signal CL2 whose phase is opposite to that of the first carrier signal CL1 is lower than that of the preset reference signal Ref_L. Accordingly, the lower the voltage level of the reference signal Ref_L, the longer the turn-off period of the second switching element Sb2.

When the turn-off period of the second switching element Sb2 becomes longer, the coil current is continuously lowered. Thus, it is necessary to suppress the coil current dropdown. Therefore, the second controller 314 sets a low limit level Lm2 so that the voltage level of the reference signal Ref_L is included in a range above the low limit level Lm2.

Due to the low limit level Lm2, the second controller 314 allows the turn-on period of the first and second switching elements Sb1 and Sb2 to be secured. This may allow securing a charging time duration of the operating voltage of the first switching element Sb1 while suppressing the dropdown of the coil current.

In the control device and the control method of the magnetic bearing according to the embodiments of the present disclosure, the plurality of switching control signals Sci may be generated so that the charging time duration of the bootstrap capacitor of the coil driver 320 is secured. This allows the bootstrap capacitor to be efficiently charged. Thus, a structure of the coil driver 320 is simplified due to the added bootstrap capacitor.

Moreover, in the control device and the control method of the magnetic bearing according to the embodiments of the present disclosure, coil current supply is limited on a preset period basis when the coil driver 320 is controlled to be turned on/off. Accordingly, the ripple of the coil current of the magnetic bearing 100 may be suppressed and thus the power loss of the magnetic bearing coil may be reduced.

The present disclosure has been described with reference to the embodiments shown in the drawings. The embodiments are only an example. Those of ordinary skill in the art to which the art pertains will understand that various modifications and other equivalent embodiments thereto may be realized. Therefore, the true technical protection scope of the present disclosure should be defined by the claims below.

What is claimed is:

1. A device for controlling a magnetic bearing, the device comprising:
   a bearing controller configured to output a plurality of switching control signals, based on gap information between a bearing coil and a rotor, and current information applied to the bearing coil; and
   a coil driver configured to turn on or off a plurality of switching elements contained therein, based on the plurality of switching control signals, thereby to control a current amount applied to the bearing coil and thus to control an intensity of a magnetic field generated between the bearing coil and the rotor,
   wherein the coil driver includes a first capacitor charged or discharged by a switching operation of a first switching element, and a bootstrap capacitor charged or discharged by a switching operation of a second switching element, and
   wherein the bearing controller is configured to generate and output the plurality of switching control signals so that the bootstrap capacitor is gradually charged or gradually discharged.

2. The device of claim 1, wherein the bearing controller is configured to:
   generate the plurality of switching control signals to perform a first operation mode in which each of the bearing coil and the bootstrap capacitor of the coil driver are charged, such that the rotor takes off from the bearing coil;
   vary the plurality of switching control signals to perform a second operation mode in which the current amount applied to the bearing coil is maintained by the bootstrap capacitor of the coil driver; and
   vary and output the plurality of switching control signals to perform a third operation mode in which each of the bearing coil and the bootstrap capacitor of the coil driver is discharged in a stepwise manner, such that the rotor lands on the bearing coil.

3. The device of claim 1, wherein the bearing controller includes:
   a current command generator configured to generate a current command value for controlling the current amount of the coil driver, based on the gap information input from at least one the gap sensor and a preset gap command value; and a duty generator configured to:
  generate a duty command value for controlling on/off of each of the switching elements contained in the coil driver for each switching element, based on current information input from at least one current detector and the current command value; and
  generate the plurality of switching control signals in a corresponding manner to the duty command value for each switching element.

4. The device of claim 3, wherein the current command generator includes:
  a first calculator configured to output a difference value between the gap information and the preset gap command value;
  a first controller configured to generate and output the current command value for controlling the current amount of the coil driver, based on the difference value between the gap information and the gap command value; and
  a limiter configured to limit a level of the current command value so that the current command value does not exceed a preset allowable range.

5. The device of claim 3, wherein the duty generator includes:
  a second calculator configured to output a difference value between the current information from the current detector and the current command value from the current command generator; and
  a second controller configured to:
    generate the duty command value for controlling on/off of each of the switching elements contained in the coil driver for each switching element, based on the difference value between the current information and the current command value; and
    generate the plurality of switching control signals in a corresponding manner to the duty command value for each switching element.

6. The device of claim 5, wherein the second controller is configured to:
  generate the plurality of switching control signals to perform a first operation mode in which each of the bearing coil and the bootstrap capacitor of the coil driver are charged, such that the rotor takes off from the bearing coil;
  vary the plurality of switching control signals to perform a second operation mode in which the current amount applied to the bearing coil is maintained by the bootstrap capacitor of the coil driver; and
  vary and output the plurality of switching control signals to perform a third operation mode in which each of the bearing coil and the bootstrap capacitor of the coil driver is discharged in a stepwise manner, such that the rotor lands on the bearing coil.

7. The device of claim 5, wherein the second controller is configured to output the plurality of switching control signals such that, for a period in which the coil driver is activated in each of the first to third operation modes, at least one of first to fourth switching modes for switching first and second switching elements of the coil driver, respectively, is selectively applied.

8. A method for operating a magnetic bearing control device, the method comprising:
  outputting, by a coil driver, a plurality of switching control signals, based on gap information between a bearing coil and a rotor, and current information applied to the bearing coil; and
  turning on or off a plurality of switching elements contained in the device, based on the plurality of switching control signals, thereby to control a current amount applied to the bearing coil and thus to control an intensity of a magnetic field generated between the bearing coil and the rotor,
  wherein the coil driver includes a first capacitor charged or discharged by a switching operation of a first switching element, and a bootstrap capacitor charged or discharged by a switching operation of a second switching element, and
  wherein outputting the plurality of switching control signals includes generating and outputting the plurality of switching control signals so that the bootstrap capacitor is gradually charged or gradually discharged.

9. The method of claim 8, wherein outputting the plurality of switching control signals includes:
  generating the plurality of switching control signals to perform a first operation mode in which each of the bearing coil and the bootstrap capacitor of the coil driver are charged, such that the rotor takes off from the bearing coil;
  varying the plurality of switching control signals to perform a second operation mode in which the current amount applied to the bearing coil is maintained by the bootstrap capacitor of the coil driver; and
  varying and outputting the plurality of switching control signals to perform a third operation mode in which each of the bearing coil and the bootstrap capacitor of the coil driver is discharged in a stepwise manner, such that the rotor lands on the bearing coil.

10. The method of claim 9, wherein outputting the plurality of switching control signals includes outputting the plurality of switching control signals such that, for a period in which the coil driver is activated in each of the first to third operation modes, at least one of first to fourth switching modes for switching first and second switching elements of the coil driver, respectively, is selectively applied.

11. The method of claim 8, wherein outputting the plurality of switching control signals includes generating a current command value for controlling the current amount of the coil driver, based on the gap information input from at least one the gap sensor and a preset gap command value;
  generating a duty command value for controlling on/off of each of the switching elements contained in the coil driver for each switching element, based on current information input from at least one current detector and the current command value; and
  generating the plurality of switching control signals in a corresponding manner to the duty command value for each switching element.

12. The method of claim 11, wherein generating the current command value includes:
  outputting a difference value between the gap information and the preset gap command value;
  generating and outputting the current command value for controlling the current amount of the coil driver, based on the difference value between the gap information and the gap command value; and
  limiting a level of the current command value so that the current command value does not exceed a preset allowable range.

13. The method of claim 11, wherein generating the duty command value includes:
- outputting a difference value between the current information from the current detector and the current command value from the current command generator;
- generating the duty command value for controlling on/off of each of the switching elements contained in the coil driver for each switching element, based on the difference value between the current information and the current command value; and
- generating the plurality of switching control signals in a corresponding manner to the duty command value for each switching element.

\* \* \* \* \*